(12) United States Patent
Tanaka et al.

(10) Patent No.: US 7,713,458 B2
(45) Date of Patent: May 11, 2010

(54) METHOD OF MANUFACTURING LAMINATED SEAMLESS BELT AND LAMINATED SEAMLESS BELT

(75) Inventors: Masakazu Tanaka, Hyogo (JP); Takayuki Hattori, Hyogo (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 621 days.

(21) Appl. No.: 11/600,720

(22) Filed: Nov. 17, 2006

(65) Prior Publication Data
US 2007/0062635 A1 Mar. 22, 2007

Related U.S. Application Data

(62) Division of application No. 10/945,997, filed on Sep. 22, 2004, now Pat. No. 7,144,621.

(30) Foreign Application Priority Data
Oct. 31, 2003 (JP) ............................. 2003-373688

(51) Int. Cl.
 B32B 25/00 (2006.01)
 B29C 47/06 (2006.01)
(52) U.S. Cl. .................. 264/174.11; 264/104; 264/105; 264/171.26; 264/173.16; 264/563; 264/564; 156/244.13; 156/244.14
(58) Field of Classification Search ............. None
See application file for complete search history.

(56) References Cited

U.S. PATENT DOCUMENTS

| 4,315,882 | A | * | 2/1982 | Hiratsuka et al. ...... 264/174.11 |
|---|---|---|---|---|
| 5,156,915 | A | | 10/1992 | Wilson et al. |
| 5,172,173 | A | | 12/1992 | Goto et al. |
| 5,255,904 | A | | 10/1993 | Taguchi et al. |
| 5,525,446 | A | | 6/1996 | Sypula et al. |
| 5,978,639 | A | | 11/1999 | Masuda et al. |
| 6,044,243 | A | | 3/2000 | Hara et al. |
| 6,132,828 | A | | 10/2000 | Yasui et al. |
| 6,377,771 | B1 | | 4/2002 | Verluyten et al. |
| 6,600,893 | B2 | * | 7/2003 | Ashibe et al. ............... 399/302 |
| 6,673,407 | B2 | | 1/2004 | Hara et al. |
| 6,728,502 | B2 | | 4/2004 | Hara et al. |
| 6,737,133 | B2 | | 5/2004 | Kusaba et al. |
| 6,856,776 | B2 | | 2/2005 | Matsuda et al. |
| 2002/0104606 | A1 | | 8/2002 | Ohzuru et al. |
| 2003/0175045 | A1 | | 9/2003 | Hara |

(Continued)

FOREIGN PATENT DOCUMENTS

JP 53-087738 A 8/1978

(Continued)

*Primary Examiner*—Jeffrey Wollschlager
(74) *Attorney, Agent, or Firm*—Birch, Stewart, Kolasch & Birch, LLP

(57) ABSTRACT

A laminated seamless belt having at least a base layer and an outer layer. The base layer contains a polyester thermoplastic elastomer as its main component. The base layer has a volume resistivity set to not less than $1.0\times10^{6}(\Omega\cdot cm)$ nor more than $1.0\times10^{11}(\Omega\cdot cm)$. A volume resistivity of the outer layer is set to not less than $1.0\times10^{11}(\Omega\cdot cm)$ and not less than 10 times as large as that of the base layer. The base layer and the outer layer are formed by laminated extrusion.

5 Claims, 2 Drawing Sheets

U.S. PATENT DOCUMENTS

| | | |
|---|---|---|
| 2004/0105983 A1 | 6/2004 | Hattor et al. |
| 2004/0143042 A1 | 7/2004 | Tanaka et al. |

FOREIGN PATENT DOCUMENTS

| | | | |
|---|---|---|---|
| JP | 61-118202 A | | 6/1986 |
| JP | 62-203169 | | 9/1987 |
| JP | 62203169 | * | 9/1987 |
| JP | 62-239166 | | 10/1987 |
| JP | 63-202537 | | 8/1988 |
| JP | 63202537 | * | 8/1988 |
| JP | 3-192282 A | | 8/1991 |
| JP | 06-130830 A | | 5/1994 |
| JP | 8-240965 A | | 9/1996 |
| JP | 08-292648 | | 11/1996 |
| JP | 2000-168989 | | 10/2000 |
| JP | 2001-208249 A | | 8/2001 |
| JP | 2002-20589 A | | 1/2002 |
| JP | 2002-214926 A | | 7/2002 |
| JP | 2003-98841 A | | 4/2003 |
| JP | 2003147196 | * | 5/2003 |
| JP | 2003-268209 A | | 9/2003 |
| WO | WO-03/002352 A1 | | 1/2003 |

* cited by examiner

METHOD OF MANUFACTURING LAMINATED SEAMLESS BELT AND LAMINATED SEAMLESS BELT

CROSS-REFERENCE TO RELATED APPLICATIONS

The present application is a 37 C.F.R. §1.53(b) divisional of U.S. application Ser. No. 10/945,997 filed Sep. 22, 2004, now U.S. Pat. No. 7,144,621 which in turn claims priority on Japanese Application No. 2003-373688 filed Oct. 31, 2003. The entire contents of each of these applications is hereby incorporated by reference.

BACKGROUND OF THE INVENTION

Field of the Invention

The present invention relates to a method of manufacturing a laminated seamless belt and to the laminated seamless belt. More particularly, the laminated seamless belt is used suitably as an intermediate transfer belt of image-forming apparatuses such as a copying apparatus, a color copying apparatus, and the like.

In the image-forming apparatus, a toner image formed on a photoconductor is transferred to an intermediate transfer member, and then to a transfer object (mainly paper). A conductive seamless belt (hereinafter referred to as belt) is used as the intermediate transfer member. The intermediate transfer belt is tensionally mounted on a driving shaft and used for a long time. Thus the intermediate transfer belt is demanded to be durable. Further the intermediate transfer belt is charged and discharged repeatedly. Therefore the intermediate transfer belt is also demanded not to generate transfer nonuniformity by reducing the potential difference and the electric resistance value while maintaining a sufficient electric charge.

A conductive belt widely used has a single layer composed of a resin and an electroconductive filler consisting of carbon black or a metal oxide added to the resin.

In the single-layer belt, it is difficult to uniformly disperse the conductive agent in the resin in kneading the conductive agent into the resin. Therefore there is a large variation in the electric resistance value inside the formed belt. Consequently transfer nonuniformity is liable to occur when the toner image developed on the photoconductor is transferred to the belt. Hence it is difficult to obtain a preferable image.

In addition to the method of using the electroconductive filler, a method of adding an ionic-conductive agent to the resin is known. This method reduces the variation in the electric resistance value inside the belt. However, there is a fear that the ionic-conductive agent oozes out of the belt and stains the photoconductor.

To solve the above-described problem, the transfer belt having the base member serving as the conductive member and the dielectric layered thereon is known, as disclosed in Japanese Patent Application Laid-Open No. 53-87738 (patent document 1). The transfer belt having the laminated construction is superior to the single-layer transfer belt in the transferring performance thereof.

In the belt having the laminated construction disclosed in Japanese Patent Application Laid-Open No. 6-130830 (patent document 2), the outer layer consists of the dielectric layer made of thermoplastic resin having a tensile modulus of elasticity of not less than 8000 Kg/cm², and the inner layer consists of the conductive layer made of the same thermoplastic resin as thermoplastic resin used for the outer layer.

In the belt having the laminated construction disclosed in the patent document 2, the tensile modulus of elasticity of the outer layer is not less than 8000 Kg/cm². Thus when the driving shaft is successively rotated with the belt stretched thereon, the belt cracks at its edge and is hence liable to be torn. Thus the belt is not durable. When the electroconductive filler such as carbon black is used to impart conductivity to the belt, the electric resistance value inside the belt is liable to have variations and a stable image cannot be obtained. When the addition amount of the electroconductive filler is large, the obtained belt is frail. When the driving shaft is successively rotated with the belt stretched thereon in the case where polycarbonate that is a preferable thermoplastic resin is used for the belt, the edge of the belt is liable to be torn. Thus the belt is not durable. When a fluorine-containing polymer such as polyvinylidene fluoride (PVDF) is used for the belt, a corrosive gas may be generated when extrusion is carried out. Thus a molding machine having a special processing done thereon is required, which is disadvantageous in terms of the manufacturing cost. Olefin materials such as polyethylene, polypropylene, and the like are unfavorable in creep characteristic, has an elongation set, and a low durability for successive use.

Patent document 1: Japanese Patent Application Laid-Open No. 53-87738

Patent document 2: Japanese Patent Application Laid-Open No. 6-130830

SUMMARY OF THE INVENTION

The present invention has been made in view of the above-described problems. Therefore it is an object of the present invention to provide a laminated seamless belt having a superior durability and a preferable transferability in successive use and repeated use. It is another object of the present invention to provide a method of manufacturing the laminated seamless belt.

To achieve the object of the present invention, in the first invention, there is provided a laminated seamless belt having a base layer and an outer layer. The base layer contains a polyester thermoplastic elastomer and an ionic-conductive agent added thereto and has a volume resistivity set to not less than $1.0\times10^6(\Omega\cdot cm)$ nor more than $1.0\times10^{11}(\Omega\cdot cm)$ A volume resistivity of the outer layer is set to not less than $1.0\times10^{11}(\Omega\cdot cm)$ and not less than 10 times as large as that of the base layer.

The laminated seamless belt of the present invention has the base layer containing the polyester thermoplastic elastomer as its main component. Therefore the laminated seamless belt has a high durability in successive use or repeated use. The base layer contains the polyester thermoplastic elastomer at favorably not less than about 60 parts by weight of the entire polymer component and more favorably at not less than about 65 parts by weight thereof.

The polyester thermoplastic elastomer used in the present invention does not have the above-described problems that occur when preferable thermoplastic resins disclosed in the patent document 2 are used, i.e., when fluorine-containing polymers such as polycarbonate and polyvinylidene fluoride (PVDF) and olefin materials such as polyethylene and polypropylene are used. Thus the laminated belt has a proper degree of elasticity and flexibility and hence displays a high durability in successive use or repeated use.

In other words, by using the polyester thermoplastic elastomer for the laminated belt, the laminated belt has a proper degree of flexibility. Further the polyester thermoplastic elastomer is resistant to shock and heat and has a favorable moldability. The addition of a lubricant to the polymer component improves the moldability to a higher extent. In addition, because the polyester thermoplastic elastomer is resistant to oil, the laminated belt containing the polyester thermoplastic elastomer is hardly modified by toner or the like and hardly stains the photoconductor. Furthermore because the polyester thermoplastic elastomer has an excellent colorability, it is possible to obtain a white belt or belts in other colors.

The colorability of the polyester thermoplastic elastomer can be improved by using titanium oxide or melamine cyanurate which can be used as a flame-retardant agent as an extender pigment.

The laminated belt of the present invention has the base layer and the outer layer. The volume resistivity of the base layer is set to not less than $1.0 \times 10^6 (\Omega \cdot cm)$ nor more than $1.0 \times 10^{11} (\Omega \cdot cm)$. The volume resistivity of the outer layer is set to not less than $1.0 \times 10^{11} (\Omega \cdot cm)$ nor more than $1.0 \times 10^{14} (\Omega \cdot cm)$ and not less than 10 times as large as that of the base layer nor more than $1.0 \times 10^8 (\Omega \cdot cm)$. Therefore the laminated belt displays a favorable transfer performance.

When the laminated belt of the present invention is used as the intermediate transfer belt, it is necessary to hold the electric potential of the belt and that of toner for a predetermined period of time during the interval between a first transfer and a second transfer in the transfer process of transferring toner from a photoconductor to the belt (first transfer), holding a toner image on the belt, and transferring the toner image to a transfer object (second transfer). To this end, it is preferable that the surface of the belt which contacts the toner consists of a dielectric layer. To accomplish the first transfer efficiently, it is advantageous to transfer the toner from the photoconductor to the belt at a possible lowest potential difference. Thus it is desirable that the volume resistivity of the belt is low. The construction of the laminated belt of the present invention is superior in its transferability because it satisfies the above-described requirements.

That is, to hold an electric charge to such an extent that a toner electrostatic image can be held on the belt, it is necessary that the volume resistivity of the base layer is not less than $1.0 \times 10^6 (\Omega \cdot cm)$. The volume resistivity of the base layer is set to less than $1.0 \times 10^{11} (\Omega \cdot cm)$ to set a voltage necessary for a charging process and a transferring process to a practical-use level, facilitate destaticization in removing toner which remains on the belt, and maintain cleaning performance.

The volume resistivity of the outer layer which contacts the toner is set to not less than $1.0 \times 10^{11} (\Omega \cdot cm)$ to hold the electric charge of the toner image formed on the belt, when the laminated belt is used as the intermediate transfer belt. The volume resistivity of the outer layer is set to not more than $1.0 \times 10^{14} (\Omega \cdot cm)$ to make it difficult for a transfer medium such as paper to be attracted by an electrostatic force so that transport of the transfer medium is not interfered.

The volume resistivity of the outer layer is set to not less than 10 times as large as that of the base layer to make it easy to hold the electric charge of the toner. The laminated belt provides a preferable image, when the volume resistivity of the base layer and that of the outer layer fall within the above-described range and when the volume resistivity of the outer layer is not less than 10 times as large as that of the base layer.

A conductive agent is added to the polymer component to allow the base layer of the laminated belt to have the above-described volume resistivity. An ionic-conductive agent is used as the conductive agent.

As described previously, the conductive agent is divided into the electroconductive agent and the ionic-conductive agent. Both the electroconductive agent and the ionic-conductive agent can be used in terms of impartation of conductivity to the laminated belt. The ionic-conductive agent is used in the present invention. The use of the ionic-conductive agent allows the belt to have a smaller variation in its electric resistance value than the use of the electroconductive agent. Thus transfer nonuniformity occurs little when a toner image developed on a photoconductor is transferred to the belt. Therefore the belt provides a preferable image.

It is favorable that the outer layer contains the polyester thermoplastic elastomer as its main component. It is more favorable that the outer layer has the same composition as that of the base layer except the conductive agent. As the composition of the outer-layer material becomes more proximate to that of the base-layer material, the adhesive strength between the outer layer and the base layer becomes increasingly favorable. Consequently it is easy to perform laminated forming.

It is favorable that the outer layer does not contain the conductive agent. Thereby it is possible to prevent the conductive agent contained in the base layer from migrating to the photoconductor owing to contact between the belt and the photoconductor or from migrating to the toner owing to contact between the belt and the toner.

The laminated belt of the present invention has an entire thickness of 100 to 500 µm and favorably 150 to 400 µm. It is preferable that the thickness of the outer layer is set to not more than ⅕ of the entire thickness of the laminated seamless belt and not less than 10 µm.

By setting the thickness of the laminated belt and that of the outer layer as described above, it is easy to accomplish the first transfer at a comparatively low potential difference and hold the electric potential of the toner in the interval between the first transfer and the second transfer.

More specifically, the entire thickness of the belt is set to not less than 100 µm for the following reason: If the entire thickness of the belt is set to less than 100 µm, the belt is limp. Consequently handleability of the belt is very bad at the time of manufacturing the belt and mounting the belt on a machine. Hence the productivity is low. The entire thickness of the belt is set to not more than 500 µm for the following reason: If the entire thickness of the belt is more than 500 µm, the belt has a high flexural rigidity. Consequently the driving performance of the belt is low. Further a high voltage is required at the time of the first transfer in which the toner is transferred from the photoconductor to the belt.

The thickness of the outer layer is set to not more than ⅕ of the entire thickness of belt for the following reason: If the thickness of the outer layer having a high electric resistance value is thick, a high voltage is required in a charging process and a transferring process. Thus the belt is inapplicable to practical use. The reason the thickness of the outer layer is set to not less than 10 µm is because it is impossible to reliably form a layer whose thickness is smaller than 10 µm.

Any manufacturing methods can be adopted, provided that they are capable of forming a laminated construction having at least the base layer and the outer layer. For example, it is possible to adopt a spray method or a dipping method of applying a material constituting the outer layer (hereinafter referred to as outer-layer material) to the base layer, an injection molding method, a blow molding method, and an inflation molding method.

In the second invention, there is provided a method of manufacturing a laminated seamless belt having at least a base layer and an outer layer. The method includes the steps of using a thermoplastic elastomer as a material of the base layer and as a material of the outer layer; adding a conductive agent to the material of the base layer; laminating and extruding the melted material of the base layer and the melted material of the outer layer cylindrically and simultaneously by using a die; setting a temperature of the die at a time of the extrusion to a temperature higher than a temperature at which the material of the base layer and the material of the outer layer can be plasticized; and setting a melting viscosity of the material of the outer layer to not less than 100 (Pa·s) and to not less than about ⅕ times nor more than five times as high as the melting viscosity of the material of the base layer at the temperature set for the die.

A material constituting the base layer (hereinafter referred to as base-layer material) and the outer-layer material are kneaded separately by a twin screw extruder, an enclosed mixer, an open roll or a kneader to pelletize each kneaded material. Each pellet is supplied to a hopper of a mono-axial laminated extrusion machine to plasticize each kneaded material. An appropriate amount of each of both kneaded materials is supplied to a cross head die and extruded, with both kneaded materials laminated on each other by using a gear pump. Both kneaded materials are extruded cylindrically from a die lip. As the die for extruding both kneaded materials in a laminated state, a spiral-type die constructed of cylinders combined with each other is used.

It is possible to supply the melted materials kneaded by the twin screw extruder to the die from the gear pump in a laminated state. That is, the twin screw extruder can be used to form the materials.

The base-layer material and the outer-layer material of the laminated belt are not limited to specific materials so long as they satisfy the above-described volume resistivity. However, as described above, the outer-layer material is made of a thermoplastic elastomer whose melting viscosity is not less than 100 (Pa·s) and is not less than ⅕ times nor more than five times as high as the melting viscosity of the base-layer material at a temperature set for the die at the extrusion time.

By setting the melting viscosity of the base layer and that of the outer layer as described above, there is little difference in the flowability between ducts for the laminated materials in the cross head die. Therefore the cylindrically melted laminated materials extruded to the atmosphere from the die lip flows stably. Thereby it is possible to obtain a belt having a predetermined configuration with high accuracy.

That is, when the melting viscosity of the outer layer is less than 100 (Pa·s), the draw-down of the melted material extruded from the die lip is high. Consequently it is difficult to mold the material along a sizing die provided directly downstream from the die lip. It is more favorable that the melting viscosity of the outer layer is not less than 150 (Pa·s).

If the melting viscosity of the outer-layer material is more than five times as high as that of the base-layer material, resin for the base layer and the resin for the outer layer melted in the laminating die are laminated on each other in a portion near the die lip. If the melting viscosity of the outer-layer material is more than five times as high as that of the base-layer material, the flow of each of the base-layer material and the outer-layer material is turbulent in a portion where they are laminated on each other. Thus the flow speed of the laminated melted materials becomes unstable. Therefore the discharge state of the melted resin is unstable. This causes a molded product to deform. Thus it is impossible to obtain a good belt.

In the case where a shear speed at the time of the laminated extrusion is set to 10 (l/cm) and 100 (l/cm) when the die has a temperature 230° C. high enough to plasticize the outer-layer material and the base-layer material, the viscosity of the outer-layer material/the viscosity of the base-layer material is set to not less than ⅕ (=0.2) nor more than 5, as described above.

It is preferable that the melting point of the outer-layer material falls within ±50° C. of the melting point of the base-layer material. When the molding temperature of the die is adjusted to the material having a lower melting point in laminating the melted outer-layer material and the melted base-layer material on each other in the die, the material having a higher melting point sets. Thus molding cannot be accomplished. Therefore it is necessary to adjust the molding temperature to the material having the higher melting point. To avoid decomposition or deterioration of the material having the lower melting point and integrally mold the outer-layer material and the base-layer material when the molding temperature is adjusted to the material having the higher melting point, it is preferable that the melting point of the outer-layer material falls within the above-described range.

In the present invention, as the polyester thermoplastic elastomer which is used for the base-layer material and the outer-layer material, it is possible to use the polyester thermoplastic elastomer having a hardness, a modulus of elasticity, and moldability suitable for the characteristic demanded for the belt.

To prevent turbulence of an image which occurs owing to elongation of the belt when it is driven, it is preferable that the tensile modulus of elasticity thereof is in the range of 500 to 5000 kg/cm$^2$.

To facilitate melt extrusion, it is preferable that the melt flow index (MI) is in the range of 1 to 30 g per 10 minutes.

As the polyester thermoplastic elastomer, a polyester polyether thermoplastic elastomer and polyester polyester thermoplastic elastomer can be used singly or in combination.

When ionic conductive agent is used in the thermoplastic elastomer, cations are captured in the vicinity of the ether linkage of polyether or the ester linkage of polyester. Therefore when the conductive agent forms a salt, the salt hardly oozes out of the system. Thus the polyester thermoplastic elastomer is capable of displaying a preferable electric conductivity. In the polyether polyester thermoplastic elastomer, the molecular chain which is a soft segment has slight variations in its modulus of elasticity between the state of a low temperature and humidity and the state of a high temperature and humidity. Therefore the polyether polyester thermoplastic elastomer allows the electric resistance value of the belt to be dependent on environment to a low extent.

It is preferable that the polyester thermoplastic elastomer is a copolymer of a hard segment consisting of polyester having the aromatic ring and a low-melting point soft segment consisting of polyether and/or polyester. It is also preferable that the polyester thermoplastic elastomer has a melting point of not less than 150° C. when a high polymeric substance consists of a high-melting point polyester segment component. It is also preferable that the polyester thermoplastic elastomer has a melting point or a softening point of not more than 80° C. when the high polymeric substance consists of a low-melting point soft segment component.

As the component composing the high-melting point polyester segment having the aromatic ring, it is possible to use aromatic dicarboxylic acid such as terephthalic acid, isophthalic acid, diphenyl dicarboxylic acid, 2,6-naphthalene dicarboxylic acid; esters of the aromatic dicarboxylic acid; glycol whose number of carbon atoms is one to 25; and ester-forming derivatives of the glycol. It is preferable that the terephthalic acid is contained at not less than 70 mol % of the entire acidic component composing the high-melting point polyester segment. Other acidic components can be used as necessary. The amount of these components is favorably not more than 30 mol % and more favorably not more than 25 mol % of the entire acidic component. As the glycol whose number of carbon atoms is 1 to 25, ethylene glycol, 1,4-butanediol, and ester-forming derivatives of the ethylene glycol and 1,4-butanediol are available.

As the low-melting point soft segment consisting of polyether, polyalkyleneether glycol such as poly (ethylene oxide) glycol and poly (tetramethylene oxide) glycol is available. The poly (tetramethylene oxide) glycol is favorable in consideration of its low melting point and moldability. It is particularly preferable that the molecular weight of the polyglycol is 800 to 1500 in terms of its low-temperature characteristic. It is favorable that 15% to 75% of the low-melting point soft segment is contained for the whole weight of the polyester thermoplastic elastomer.

It is preferable to use lactones as the low-melting point soft segment consisting of polyester. Caprolacton is most favorable as the lactones. In addition, enanlacton and caprylolacton can be used as the lactones. These lactones can be used singly or in combination. The copolymerization ratio between the aromatic polyester and the lactones are selected according to use. It is preferable that the standard weight ratio between the aromatic polyester and the lactones is set to 97/3 to 5/95 and preferably 95/5 to 30/70.

As the ionic-conductive agent to be used in the present invention, an antistatic agent or a charge control agent is used singly or in combination.

Any antistatic agents for use in toner for developing an electrostatic latent image can be used. As the antistatic agent which is negatively charged, it is possible to use 2:1 type metal-containing azo dye, aromatic oxycarboxylic acid, metal complex of aromatic dicarboxylic acid, sulfonyl amine derivative of copper phthalocyanine dye, sulfonamide derivative dye of copper phthalocyanine. As the antistatic agent which is positively charged, it is possible to use quaternary ammonium compounds, alkylpyridinium compounds, alkylpicolinium compounds, nigrosine dyes.

As the charge control agent, it is possible to use organic metal complex, metal salt, chelate compound, monoazo metal complex, acetyl acetone metal complex, hydroxy-carboxylic acid metal complex, polycarboxylic acid metal complex, and polyol metal complex. In addition, it is possible to use quaternary ammonium salts, metal salts of carboxylic-acid, anhydride of carboxylic acid, derivatives of carboxylic acid such as esters, condensates of aromatic compounds. It is also possible to use phenol derivatives such as bisphenols and calix allene.

As the ionic-conductive agent, it is possible to use sodium perchlorate ($NaClO_4$) or lithium perchlorate ($LiClO_4$). To prevent these salts from making an explosive reaction when they are kneaded into resin, they are dissolved in adipate. Therefore it is preferable to use each of the above-described salts in the form of a solution containing the adipate and the salt.

In the present invention, as the ionic-conductive agent, it is possible to use a salt having an anion shown by a chemical formula 1 shown below. It is preferable to use the salt as the ionic-conductive agent because it can be handled easily, is safe, and allows a preferable electric resistance value to be obtained.

Chemical formula 1

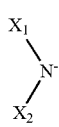

where $X_1$ and $X_2$ denote functional groups, identical to or different from each other, in which the number of carbon atoms is 1 to 8 and which contain carbon atom, fluorine atom, and sulfonyl group ($-SO_2-$).

The anion-containing salt shown in the chemical formula 1 is stabilized as anions by the electron attraction property of the fluoro group and the sulfonyl group of the functional group of $X_1$ and $X_2$ of the chemical formula 1. Thus the anions show a high dissociation degree. Thereby the conductive polymer composition is capable of obtaining a very low electric resistance value by adding a small amount of the anion-containing salt to the entire polymer component. The anion-containing salt is chemically and electrochemically stable for electrodes or the like and is safe. Further the anion-containing salt can be used in a wide range of temperature, allows the electric resistance of the belt to be adjusted easily, and allows the electric resistance value inside the belt to have slight variations. Therefore the electric resistance value of the belt is dependent on environment to a low extent. Thus the belt hardly stains the photoconductor. Furthermore the anion-containing salt is inexpensive and easily commercially available. The anion-containing salt is powdery at the room temperature and can be kneaded easily. The anion-containing salt allows the thermoplastic composition to have a smooth extruded surface.

In the salt shown in the chemical formula 1, $X_1$ and $X_2$ are functional groups which contain all of carbon atoms, fluorine atoms, and sulfonyl group ($-SO_2-$) and have one to eight carbon atoms. As the functional groups $X_1$ and $X_2$, a group shown by $R-SO_2-$ (R denotes hydrocarbon group having 1 to 8 carbon atoms) is available. As hydrocarbon groups having 1 to 8 carbon atoms, alkyl groups such as methyl group, ethyl group, n-propyl group, isopropyl group, n-butyl group, isobutyl group, tert-butyl group, n-pentyl group, isopentyl group, tert-pentyl group, n-hexyl group, 1,1-dimethyl propyl group, and 3-methyl-3-butenyl group; alkenyl group such as vinyl group, aryl group, 1-propenyl group, isopropenyl group, 1-butenyl group, 1,3-butadienyl group, and 2-pentenyl group; and alkynyl group such as ethynyl group, 2-propynyl group, 1-butynyl group, and 2-butynyl group. Neither the number of fluorine atoms to be used as a substituting group nor a substituting position is specifically limited in a range in which they are permitted chemically.

In terms of stability, cost, and handleability, it is preferable that $X_1-$ of the chemical formula 1 is $C_{n1}H_{m1}F_{(2n1-m1+1)}-SO_2-$ and that $X_2-$ of the chemical formula 1 is $C_{n2}H_{m2}F_{(2n2-m2+1)}-SO_2-$ (n1 and n2 are integers which are not less than 1 and identical to or different from each other, and m1 and m2 which are integers not less than 0 and identical to or different from each other)

It is preferable that the cation which makes a pair with the anion shown in the chemical formula 1 and constitutes the salt is the cation of any one of the alkali metals, the group 2A metals, the transition metals, and the amphoteric metals. The alkali metals are more favorable than the other metals, because the alkali metals have a small ionization energy and thus form stable cations readily. Of the alkali metals, lithium is preferable as the metal which constitutes the cation, because lithium has a high conductivity. In addition to the cations of the metals, salts having cations shown in the chemical formulas 2 and 3 can be used.

Chemical formula 2

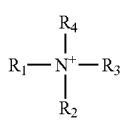

($R_1$ through $R_4$ denote alkyl group, identical to or different from each other, in which the number of carbon atoms is 1 to 20)

Chemical formula 3

($R_5$ and $R_6$ denote alkyl group, identical to or different from each other, in which the number of carbon atoms is 1 to 20)

As alkyl groups having 1 to 20 carbon atoms in "alkyl group having 1 to 20 carbon atoms which may have substituting group" shown by $R_1$ to $R_6$, methyl, ethyl, n-propyl, i-propyl, n-butyl, s-butyl, t-butyl, n-heptyl, n-hexyl, n-decyl, vinyl, propanyl, and hexenyl are listed. As the substituting group, it is possible to list halogen (preferably fluorine, chlorine, and bromine), oxo group, alkanol group (preferably $C_1$ to $C_8$), alkanoloxy group (preferably $C_1$ to $C_8$), alkanolamino group (preferably $C_1$ to $C_8$), carboxylic group, alkoxycarbonyl (preferably $C_2$ to $C_8$), haloalkylcarbonyl (preferably $C_2$ to $C_8$), alkoxy group (preferably $C_1$ to $C_8$), haloalkoxy group (preferably $C_1$ to $C_8$), amino group, alkylamino group (preferably $C_1$ to $C_8$), dialkylamino group (preferably $C_2$ to $C_{16}$), a cyclic amino group, alkylaminocarbonyl group (preferably $C_2$ to $C_8$), carbamoyl group, hydroxyl group, nitro group, cyano group, mercapto group, alkylchio group (preferably $C_1$ to $C_8$), alkylsulfonyloxy group (preferably $C_1$ to $C_8$), alkylsulfonylamino group (preferably $C_1$ to $C_8$), and phenyl group.

As cations shown in the chemical formula 2, it is particularly preferable to use a salt containing trimethyl-type quaternary ammonium cations in which three of $R_1$ through $R_4$ consists of methyl group and the remaining one consists of the alkyl group, having 7 to 20 carbon atoms, which may have substituting group. This is because the trimethyl-type quaternary ammonium cations are capable of stabilizing the positive electric charge of nitrogen atoms owing to the three methyl groups having strong electron-donating property and the alkyl group, having 7 to 20 carbon atoms, which may have substituting group are capable of improving compatibility with the polymer. In the cation shown in the chemical formula 3, $R_5$ or $R_6$ having a stronger electron-donating property is capable of stabilizing the positive electric charge of nitrogen atoms and thereby allowing the cation to be stable to a higher extent, thus allowing the salt to have a higher dissociation degree and superior conductivity-imparting performance. Therefore it is favorable that $R_5$ or $R_6$ consists of a group having electron-donating property and more favorable that $R_5$ or $R_6$ consists of methyl group or ethyl group.

Of the anion-containing salts shown in the chemical formula 1, lithium-bis(trifluoromethanesulfonyl)imide (($CF_3SO_2$)$_2$Nli) is favorable. When the lithium-bis imide is kneaded into the polyester thermoplastic elastomer, the lithium-bis imide hardly oozes out of the polyester thermoplastic elastomer. Therefore the lithium-bis imide has little possibility of staining the photoconductor and allows the electric resistance value of the belt to be dependent on environment to a low extent. In addition, the following salts may be used singly or in combination: ($C_2F_5SO_2$)$_2$Nli, ($C_4F_9SO_2$)($CF_3SO_2$)NLi, (FSO$_2C_6F_4$) ($CF_3SO_2$)Nli, ($C_8F_{17}SO_2$) ($CF_3SO_2$)Nli, ($CF_3CH_2OSO_2$)$_2$Nli, ($CF_3CF_2CH_2OSO_2$)$_2$Nli, (HCF$_2CF_2CH_2OSO_2$)$_{2Nli}$, (($CF_3$)$_2$CHOSO$_2$)$_2$Nli, and the like.

The addition amount of the above-described conductive agent can be selected appropriately so that the base layer has a predetermined volume resistivity. For example, the addition amount of the salt having the anion shown in the chemical formula 1 is 0.01 to 3 parts by weight and preferably 0.05 to 2.7 parts by weight for 100 parts by weight of the entire polymer component.

In the present invention, a copolymer having a polyether block may be used together with the salt having the anion shown in the chemical formula 1. This is because the polyether structure stabilizes ions of the salt. That is, the anion-containing salt, shown in the chemical formula 1, which displays an ionic conduction is selectively captured by the copolymer having the polyether block and dispersed in the polyester thermoplastic elastomer in the form of a sea-island structure. Consequently it is possible to reduce the rise of the electric resistance value during successive energization.

The glass transition temperature Tg of the copolymer having the polyether block is favorably not more than $-40°$ C. and more favorably not more than $-50°$ C. It is favorable that the glass transition temperature Tg is in the above-described range to adjust the degree of dependence of the volume resistivity on environment to a practical-use level. That is, if the glass transition temperature Tg is within the above-described range, the degree of dependence of the change in the modulus of elasticity in a belt-use temperature range on environment is low. Thereby it is possible to reduce the degree of dependence of the volume resistivity in the belt-use temperature range on environment. In the present invention, the glass transition temperature Tg of the copolymer having the polyether block is not less than $-80°$ C. It is preferable that the glass transition temperature Tg of the polyester thermoplastic elastomer is not more than $-40°$ C.

In the present invention, the weight of the copolymer having the polyether block is favorably 1.6 to 3333 times and more favorably 10 to 3000 times as large as that of the anion-containing salt shown in the chemical formula 1. Thereby the polymer is capable of maintaining a preferable extruded surface and obtaining a preferable electrical characteristic. To prevent difficulty in suppressing a rise of the electric resistance value of the belt owing to an insufficient dispersion of the salt into the copolymer having the polyether block, it is preferable that the weight of the copolymer having the polyether block is not less than 1.6 times as large as that of the anion-containing salt shown in the chemical formula 1. To prevent difficulty in sufficiently reducing the electric resistance value of the belt owing to a reduction of the concentration of the salt, it is preferable that the weight of the copolymer having the polyether block is not more than 3333 times as large as that of the anion-containing salt shown in the chemical formula 1.

The copolymer having the polyether block may be contained in the base layer or/and the outer layer. But it is preferable that the copolymer having the polyether block is contained in only the outer layer.

It is preferable that the copolymer having the polyether block is selected from among a polyethylene oxide block copolymer and/or a polyether ester amide copolymer. These copolymers have a high affinity for the anion-containing salt shown in the chemical formula 1 and allow the conductive polymer composition to have a preferable electric resistance value and allow the polyester thermoplastic elastomer which is the base component of the conductive polymer composition to have preferable property. A structure (percolation structure) advantageous for energization is formed in the composition and hence capable of reducing the electric resistance value to a higher extent than the conventional belt. In addition, it is possible to use a resin-type antistatic agent such as a polyether block polyolefin resin. A salt such as sodium perchlorate may be added to the copolymer.

As the copolymer having the polyether block, polyethylene oxide block polyamide copolymers are very favorable. A polyethylene oxide block nylon copolymer is particularly favorable. More specifically, it is possible to use a polyethylene oxide block nylon 11 copolymer, a polyethylene oxide block nylon 12 copolymer, and a polyethylene oxide block nylon 6 copolymer singly or in combination.

It is possible to use a mixture of the polyethylene oxide block polyamide copolymer and a polyamide homopolymer can be used. It is favorable to use a mixture of the polyethylene oxide block polyamide copolymer and the polyamide homopolymer having the same structure as that of the amide in the polyethylene oxide block polyamide copolymer may be used. The mixture which has fused at a high temperature during a molding operation is cooled and forms a phase structure. While the mixture is forming the phase structure, the polyamide homopolymer solidifies fibrously earlier than the polyethylene oxide block polyamide copolymer. Then the polyethylene oxide block polyamide copolymer is arranged effectively in the polyamide homopolymer owing to compatibility therebetween. Thereby it is possible to form the percolation structure effectively. That is, a mixture of polyethylene oxide block nylon 12 copolymer and nylon 12 and a mixture of polyethylene oxide block nylon 6 copolymer and nylon 6 are preferable because these mixtures are capable of forming the percolation structure effectively.

It is preferable to use the ionic-conductive agent. But the electroconductive agent may be added to the polymer component. As the electroconductive agent, it is possible to use carbon black such as ketchen black, furnace black, acetylene black; conductive metal oxides such as zinc oxide, potassium titanate, antimony-doped titanium oxide, tin oxide, and graphite; and carbon fibers.

The laminated belt may contain additive components so long as the object of the present invention is not damaged.

A flame-retardant additive is available as one of the additive components. A known flame-retardant additive used in the technical field to which the present invention relates can be used as the flame-retardant additive of the present invention. But it is preferable to use melamine cyanurate. The melamine cyanurate is a nitrogen-containing flame-retardant additive and thermally decomposed by heat of combustion. Consequently oxygen is replaced with nitrogen gas. That is, the melamine cyanurate has an action of preventing combustion. Therefore there is no fear that the melamine cyanurate generates a halogen-caused toxic gas. Hence the melamine cyanurate does not affect environment adversely. Since the decomposition temperature of the melamine cyanurate is not less than 300° C., the melamine cyanurate is present in the form of powder up to 300° C. Thus the melamine cyanurate does not bleed or bloom on the surface of the belt in a temperature range in which the image-forming apparatus is used and thus does not stain the photoconductor. The melamine cyanurate has another advantage that it can be handled easily. Furthermore the melamine cyanurate acts as an extender pigment as well and thus makes the seamless belt to be colored easily. For example, it is possible to obtain a white belt by adding the melamine cyanurate to the polymer component. It is preferable to use the white belt as an intermediate transfer belt, because toner which has attached thereto can be easily detected with the naked eye. Thus the white belt is favorable for evaluating cleaning performance. It is preferable not to add additives such as carbon black making the seamless belt black to the polyester thermoplastic elastomer when the white belt is to be obtained. The flame-retardant additive may be contained in the base layer or/and the outer layer. The content of the flame-retardant additive is selected appropriately according to the kind thereof. For example, the addition amount of the melamine cyanurate is 15 to 40 parts by weight and preferably 20 to 35 parts by weight for the whole weight of the laminated belt.

The belt may contain phosphoric ester whose melting point is not less than 80° C. in such a way that phosphorous thereof is not less than 0.1 wt % nor more than 0.4 wt % for the entire weight of the polymer component. By using the melamine cyanurate and the phosphoric ester in combination, the seamless belt is allowed to have higher flame-retardant performance without increasing the amount of the melamine cyanurate, have a high strength, and have a short after-flaming time period.

A filler may be used as one of the above-described additive components. The filler is used to improve the mechanical strength of the belt or as a bulk filler. As the filler, it is possible to use calcium carbonate, silica, clay, talc, barium sulfate, and diatomaceous earth. It is possible to use fatty acids such as stearic acid, lauric acid, and the like; and softeners such as cottonseed oil, tall oil, asphalt substances, paraffin wax, and the like, provided that the addition of these fatty acids and the softeners does not cause liberation of additives from the surface of the belt, bleeding, blooming, and stain of the photoconductor and the like owing to shifting thereof nor affect the conductivity of the belt adversely. Thereby it is possible to adjust the hardness and flexibility of the belt appropriately. In addition, age resistors such as imidazoles, amines, and phenols may be added to the polymer component. Further the following agents can be used as the additive components: antioxidant (phenol, sulfur), lubricant, organic and inorganic pigments, ultraviolet ray absorbent, antistatic agent, dispersant, neutralization agent, foaming agent, plasticizer, copper inhibitor, crosslinking agent, and flowability improver. Further a molding assistant such as a lubricant can be used so long as it does not inhibit interlaminar adhesiveness when the base-layer material and the outer-layer material are laminated on each other.

As described above, the laminated seamless belt of the present invention displays superior driving performance and durability owing to the use of the polyester thermoplastic elastomer for the base layer. Further the volume resistivity of the base layer and that of the outer layer are set to a predetermined range respectively to thereby allow the laminated seamless belt to show preferable transfer performance.

Since the base layer of the laminated seamless belt contains the ionic-conductive agent as its conductive agent, the laminated seamless belt has little variations in its electric resistance value.

According to the method of manufacturing the laminated seamless belt, the melted material of the base layer and the melted material of the outer layer are extruded simultaneously. Thereby it is possible to manufacture the laminated belt in a simple process and at a low cost. The manufacturing method allows the base layer and the outer layer to adhere to each other to a high extent. In this case, an integral laminated molding can be facilitated and a highly precise laminated belt can be obtained by selecting the outer-layer material and the base-layer material satisfying the above-described relationship in the melting viscosity and the melting point thereof. Above all, the base layer and the outer layer are capable of adhering to each other to a high extent when the laminated molding is performed by using the polyester thermoplastic elastomer for the outer-layer material as the main component thereof and making the composition of the outer-layer material and that of the base-layer material proximate to each other.

DETAILED DESCRIPTION OF THE PREFERRED EMBODIMENTS

The embodiments of the laminated seamless belt of the present invention will be described below.

Figure 1:
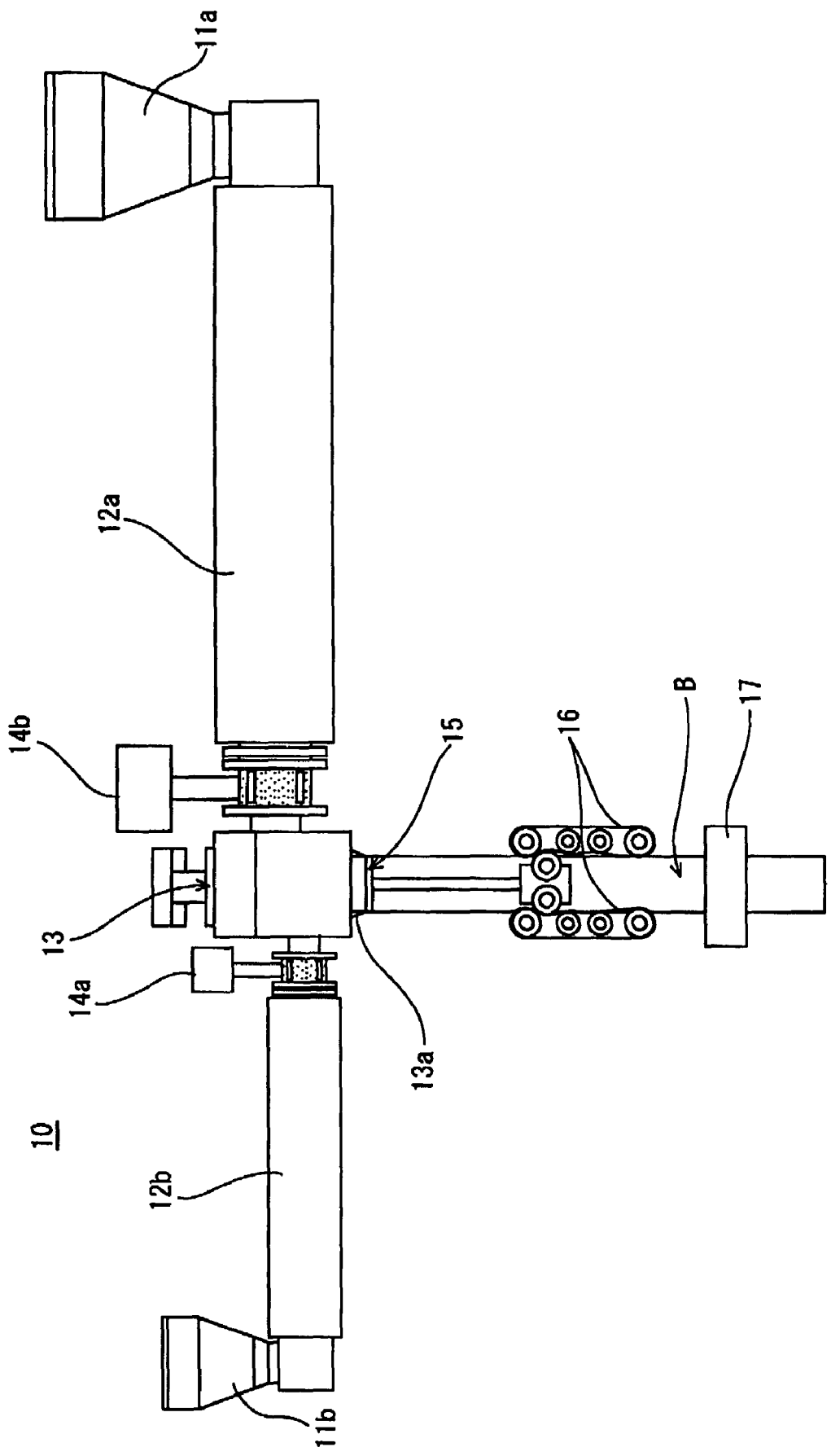
FIG. 1 is a schematic front view showing a belt-molding machine used to manufacture a laminated belt of the present invention.

The laminated seamless belt is manufactured successively by using a laminated extrusion machine shown in FIG. 1 to extrude the melted outer-layer and base-layer materials simultaneously.

More specifically, the base-layer material and the outer-layer material are prepared. The polyester thermoplastic elastomer can be used as it is for the outer-layer material. Alternatively the base-layer material and the outer-layer material are kneaded separately by a twin screw extruder to prepare a pellet of each of the base-layer material and the outer-layer material.

The pellet of the base-layer material contains the polyester thermoplastic elastomer as its main component. As a conductive agent of the base-layer material, the salt having the anion shown in the above-described chemical formula 1 is used. As the salt, $(CF_3SO_2)_2NLi$ is used. The amount of the conductive agent to be added to the polyester thermoplastic elastomer depends on the kind thereof. When $(CF_3SO_2)_2NLi$ is used, 0.5 parts by weight thereof is added to the polyester thermoplastic elastomer. The kneading temperature of the base-layer material is set to 200 to 250° C. The kneading period of time is set to 1 to 20 minutes.

The polyester thermoplastic elastomer is used as it is for the pellet of the outer layer material.

Each pellet is supplied to hoppers 11a and 11b of mono-axial extruders 12a and 12b and discharged to a cross head die 13 constructing an annular die from gear pumps 14b, 14a mounted on the front end of the mono-axial extruders 12a and 12b respectively. An annular material B in a laminated state is extruded downward in a vertical direction through the cross head die 13 and passed through an inside sizing unit 15 continuous with the lower end of the cross head die 13 to shape the annular material B into a predetermined configuration from the inner peripheral surface thereof. After the belt-shaped annular material B is passed through the inside sizing unit 15, the shaped annular material B is fed vertically downward and received by a take-off unit 16. Then an automatic cutting unit 17 cuts the shaped annular material B to a predetermined length.

The extrusion speed of the cross head die 13 should be selected appropriately according to the composition of the outer-layer material and that of the base-layer material or the thickness of the belt. As the extrusion speed of the cross head die 13, 133 ml/minute is most favorable. The temperature of the cross head die is set to a temperature higher than a temperature at which the outer-layer material and the base-layer material can be plasticized. Thus it is most favorable to set the temperature of the cross head to about 230° C. The annular material B extruded from the die lip 13a is cooled, with the annular material B being fed downward in contact with the inside sizing unit 15. In this manner, a belt-shaped annular material is formed. The cooling temperature is selected from the range of 70 to 100° C.

The use of the laminated seamless belt manufactured in the above-described method is not limited to a particular use. The laminated seamless belt can be used as an intermediate transfer belt, a fixing belt, a developing belt, and a transport belt of an image-forming apparatus such as a color copying apparatus, a facsimile, a printer, and the like. Above all, the laminated seamless belt can be particularly suitably used as the intermediate transfer belt of the image-forming apparatus.

Figure 2:
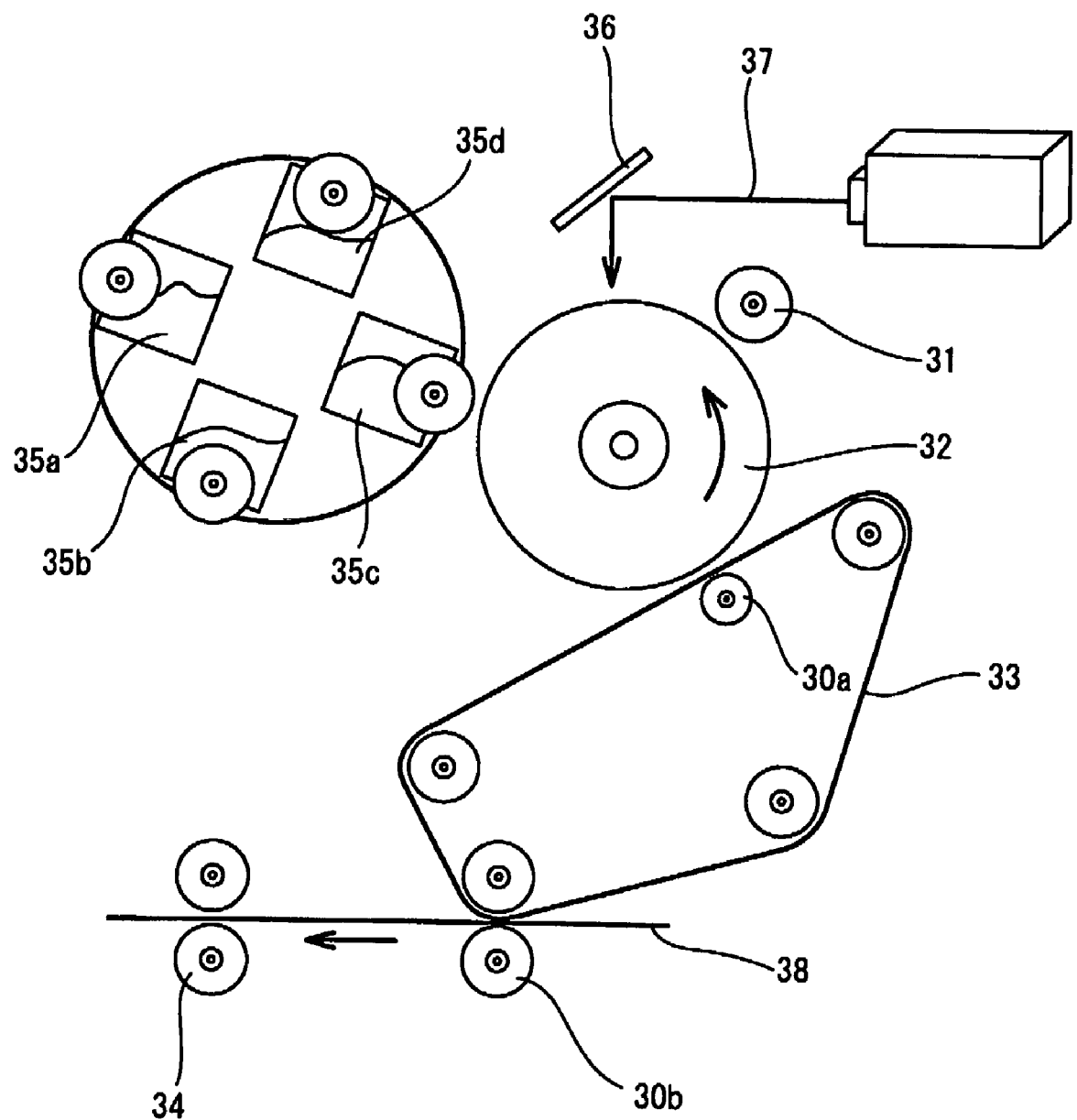
FIG. 2 is an illustrative front view showing a color image-forming apparatus having the laminated belt of the present invention.

FIG. 2 shows a color printer having the laminated seamless belt used as an intermediate transfer belt 33.

The color printer has transfer rollers 30A and 30B, a charging roller 31, a photoconductor 32, the intermediate transfer belt 33, a fuser roller 34, toner 35 in four colors (35a, 35b, 35c, and 35d), and a mirror 36.

In forming an image by the color printer, initially, the photoconductor 32 rotates in the direction shown with the arrow of FIG. 2. After the photoconductor 32 is charged by the charging roller 31, a laser 37 exposes a non-imaging portion of the photoconductor 32 via the mirror 36. As a result, the non-imaging portion is destaticized. The portion of the photoconductor 32 corresponding to an imaging portion is charged. Thereafter the toner 35a is supplied to the photoconductor 32 and attaches to the charged imaging portion to form a first-color toner image. An electric field is applied to the primary transfer roller 30a to transfer the toner image to the intermediate transfer belt 33. In the same manner, a toner image of each of the other toners 35b to 35d formed on the photoconductor 32 is transferred to the intermediate transfer belt 33. A full-color image composed of the toner 35 (35a through 35d) in four colors is formed on the intermediate transfer belt 33. An electric field is applied to the secondary transfer roller 30b to transfer the full-color image to a to-be-transferred material (normally, paper) 38. When the to-be-transferred material 38 passes between a pair of the fuser rollers 34 heated to a predetermined temperature, the full-color image is transferred to the surface thereof.

In performing double-side printing, the to-be-transferred material 38 or the like that has passed the fuser roller 34 is inverted inside the printer. Then the above-described image-forming processes are repeated. Thereby an image is formed again on the rear surface of the to-be-transferred material 38.

EXAMPLES

The examples of the present invention will be described below. The present invention is not limited to the examples.

In the examples, "Pelprene P90BD" (produced by Toyobo Co., Ltd.: polyester polyether type (glass transition temperature Tg:−56° C.)) was used as the polyester thermoplastic elastomer.

Preparation of Conductive Master Batch and Flame-retardant Master Batch (a) Preparation of Conductive Master Batch A The polyester thermoplastic elastomer and lithium-bis (trifluoromethanesulfonyl) imide which is the anion-containing salt shown in the chemical formula 1 were dry-blended by using 10 parts by weight of the lithium-bis imide for 100 parts by-weight of the polyester thermoplastic elastomer. The mixture was supplied to a hopper of the twin screw extruder to knead it at 210° C. Thereby the conductive master batch A was obtained. The temperature of the resin measured at this time was 230° C.

(b) Preparation of Conductive Master Batch B

As the ionic-conductive agent, sodium perchlorate was dissolved in adipate (dibutoxyethoxyethyl adipate) to obtain a solution in which the content of the sodium perchlorate was 14.7 parts by weight. Ten parts by weight of this solution was mixed with 90 parts by weight of the polyester thermoplastic elastomer. The mixture was supplied little by little to the twin screw extruder to knead the mixture at 210° C. Thereby the conductive master batch B was obtained. The temperature of the resin measured at this time was 230° C.

(c) Preparation of Conductive Master Batch C

The lithium-bis(trifluoromethanesulfonyl)imide which is the anion-containing salt shown in the chemical formula 1 was dry-blended with a copolymer "Irgastat P16" (produced by Ciba Specialty Chemicals: polyethylene oxide block nylon 12 copolymer (glass transition temperature Tg:−57° C.)) having the polyether block by using 5 parts by weight of the lithium-bis imide for 100 parts by weight of the copolymer. The mixture was supplied to the hopper of a twin screw extruder to knead it at 210° C. Thereby a conductive master batch C was obtained. The temperature of the resin measured at this time was 230° C.

(d) Preparation of Flame-retardant Master Batch

Melamine cyanurate (MC640 produced by Nissan Chemical Industries, Ltd.) was dry-blended with the Polyester thermoplastic elastomer by using 50 parts by weight of the melamine cyanurate for 100 parts by weight of the polyester thermoplastic elastomer. The mixture was supplied to the hopper of the twin screw extruder to knead it at 210° C. Thereby a flame-retardant master batch was obtained. The temperature of the resin measured at this time was 230° C.

Example 1

The conductive master batch A and the polyester thermoplastic elastomer were dry-blended by using 0.5 parts by weight of an ionic-conductive agent for 100 parts by weight of the polyester thermoplastic elastomer. The mixture was kneaded by the twin screw extruder at 210° C. Thereby a pellet of the base-layer material was obtained. The pellet was supplied to a hopper 11a of the laminated extrusion machine shown in FIG. 1.

The pellet consisting of the polyester thermoplastic elastomer was supplied to the hopper 11a. A mono-axial extruder for each pellet was driven. The number of rotations of the gear pump 14a disposed at the side of the base-layer material was adjusted to 12.1 rpm, whereas the number of rotations of the gear pump 14b disposed at the side of the outer-layer material was adjusted to 1.4 rpm. Melted resin was fed to the cross head die 13.

The outer-layer material and the base-layer material were laminated on each other inside the cross head die 13 whose temperature was set to 230° C. The melted outer-layer and base-layer materials were extruded downward vertically from an annular die having an inner diameter of 185 mm and a gap of 0.5 mm. Thereafter the melted outer-layer and base-layer materials were cooled by feeding them downward along the inside sizing unit 15 so that they set. They were drawn downward vertically and received by the take-off unit 16. Then they were cut to a predetermined width of 400 mm by the automatic cutting unit 17. In this manner, the laminated seamless belts of the present invention were produced successively. The belt had an inner diameter of 169.5 mm and an average thickness of 250 μm. The outer layer had a thickness of 25 μm. The ratio of the outer layer of the belt to the entire thickness thereof was ⅒. The belt had a width of 400 mm. The moldability of the belt was high.

Example 2

The polyester thermoplastic elastomer, the conductive master batch A, and the flame-retardant master batch were dry-blended to form the base-layer material by using 0.5 parts by weight of a conductive agent for the polymer component and 25 parts by weight of the flame-retardant additive for the entire weight of the belt. The components were kneaded by the twin screw extruder in the same condition as that of the example 1. By using a pellet consisting of the base-layer material obtained in this manner, a laminated seamless belt of the example 2 was produced in the same manner as that of the example 1. The moldability of the belt was high.

Example 3

To form the base-layer material, the conductive master batch B was used instead of the conductive master batch A of the example 2. The components were kneaded in the same manner as that of the example 2. The content of the ionic-conductive agent used was 0.7 parts by weight for 100 parts by weight of the polyester thermoplastic elastomer. The content of the melamine cyanurate used was 25 parts by weight for the entire weight of the belt. By using a pellet consisting of the base-layer material obtained in this manner, a laminated seamless belt of the example 3 was produced in the same manner as that of the example 1. The moldability of the belt was high.

Example 4

To form the base-layer material, the polyester thermoplastic elastomer, the copolymer "Iregastat P16" (produced by Ciba Specialty Chemicals: polyethylene oxide block nylon 12 copolymer) having the polyether block, the conductive master batch C, and the flame-retardant master batch were dry-blended and kneaded by using the twin screw extruder in the same condition as that of the example 2.

In the example 4, the content of the ionic-conductive agent used was 1.2 parts by weight for 100 parts by weight of the polymer consisting of the polyester thermoplastic elastomer and the copolymer having the polyether block. The content of the copolymer having the polyether block used was 28.5 parts by weight for 100 parts by weight of the polyester thermoplastic elastomer. The content of the melamine cyanurate used was 25 parts by weight for the entire weight of the belt. These components were kneaded in the same manner as that of the example 2 to form the base-layer material. By using a pellet consisting of the obtained base-layer material, a laminated seamless belt of the example 4 was produced in the same manner as that of the example 1. The moldability of the belt was high.

Comparison Example 1

A single-layer belt having a thickness of 250 μm was formed by using only the base-layer material of the example 1.

Comparison Example 2

A single-layer belt was formed by using only the polyester thermoplastic elastomer.

Comparison Example 3

The base layer of the comparison example 3 had the same composition as that of the example 1. As the outer layer of the belt, the "Irgastat P16" (produced by Ciba Specialty Chemicals: polyethylene oxide block nylon 12 copolymer) was used.

When laminated molding was performed in the same condition as that of the examples, the state of the melted resin discharged from the annular die was unstable. Thus the melted resin was incapable of flowing in contact with the inside sizing unit. Consequently it was impossible to mold the melted resin into the shape of a belt.

A sheet was formed from the base-layer material of the examples 1 through 4 by press molding. The following properties (a) through (c) were measured. Table 1 shows the results.

(a) Volume Resistivity

The volume resistivity was measured at a constant temperature of 23° C. and a constant relative humidity of 55% by using a High Resta URS Probe (manufactured by DIA INSTRUMENTS Co., Ltd.) The volume resistivity was measured by applying the voltage of 250V to each sheet for a time period of 10 seconds.

(b) Melting Viscosity

The melting viscosity of each of the base-layer material and the outer-layer material was measured in a Capillary Flow Test in accordance with JIS K 7199.

(c) Melting Point

The melting point of each of the base-layer material and the outer-layer material was measured by using a differential scanning calorimeter DSC 29110 (manufactured by T.A.Instrument.Japan Inc.)

TABLE 1

| | | volume resistivity (log Ω · cm) | melting viscosity (Pa · s) 230□ 10(1/cm) | melting viscosity (Pa · s) 230□ 100(1/cm) | melting point (° C.) |
|---|---|---|---|---|---|
| Example 1 | base layer | 8.7 | 2654 | 743 | 203 |
| | outer layer | 12.8 | 1622 | 1044 | 203 |
| Example 2 | base layer | 9.1 | 1103 | 482 | 203 |
| | outer layer | 12.8 | 1622 | 1044 | 203 |
| Example 3 | base layer | 8.8 | 1843 | 996 | 203 |
| | outer layer | 12.8 | 1622 | 1044 | 203 |
| Example 4 | base layer | 8.5 | 1122 | 519 | * |
| | outer layer | 12.8 | 1622 | 1044 | 203 |
| Comparison Example 3 | base layer | — | 270 | 179 | 160 |
| | outer layer | — | 1622 | 1044 | 160 |

*The melting point of copolymer having polyether block is 160° C. The melting point of polyester thermoplastic elastomer is 203° C.

As shown in table 1, in the example 1, the ratio of the melting viscosity of the outer layer to that of the base layer at the molding time was 0.61 at a shear speed of 10 (1/cm) and 1.41 at a shear speed of 100 (1/cm). In the example 2, the ratio of the melting viscosity of the outer layer to that of the base layer at the molding time was 1.47 at the shear speed of 10 (1/cm) and 2.17 at the shear speed of 100 (1/cm). In the example 3, the ratio of the melting viscosity of the outer layer to that of the base layer at the molding time was 0.88 at the shear speed of 10 (1/cm) and 1.05 at the shear speed of 100 (1/cm). In the example 4, the ratio of the melting viscosity of the outer layer to that of the base layer at the molding time was 2.08 at the shear speed of 10 (1/cm) and 3.78 at the shear speed of 100 (1/cm). Therefore in any of the examples 1 through 4, the ratio of the melting viscosity of the outer-layer material to that of the base-layer material satisfies the requirement of not less than 1/5 times nor more than five times. Consequently the belt can be formed by laminated extrusion. On the other hand, in the comparison example 3, the ratio of the melting viscosity of the outer layer to that of the base layer at the molding time was 0.1 at the shear speed of 10 (1/cm). Since the ratio of 0.1 was less than 1/5, it was impossible to mold the belt cannot be formed by simultaneous laminated extrusion.

Printing test was conducted on the belts of the examples 1 through 4 and the comparison examples 1 and 2. Each belt was mounted on a full-color electrophotographic apparatus (produced by Seiko Epson, "Inter-color LP-8300C") as an intermediate transfer belt thereof. In the printing test, the transfer performance of each belt was evaluated visually.

The belt of each of the examples 1 through 4 was evaluated as favorable in the printing test of the laminated and hence did not stain the photoconductor. In the apparatus in which the belt of the comparison example 1 was mounted, it was confirmed that the conductive agent shifted to the photoconductor in the successive printing of 5000 sheets of paper and that thus owing to deterioration of the electric potential of the photoconductor, the quality of the image formed by the apparatus was inferior. The belt of the comparison example 1 had a lower performance in the second transfer than the belts of the examples. Thus it was visually checked that toner which had not been transferred to the belt of the comparison example 1 remained on the photoconductor. In the apparatus in which the belt of the comparison example 2 was mounted, the volume resistivity was so high that the belt of the comparison example 2 had a low performance in the first transfer.

The results of the printing test indicate that when the laminated seamless belt of the present invention is used as the intermediate transfer belt, it can be confirmed that there is no nonuniformity in the transfer and hence a high-quality image can be obtained and that the conductive agent does not stain the photoconductor.

What is claimed is:

1. A method of manufacturing a laminated seamless belt which comprises a base layer and an outer layer, comprising the steps of:

laminating and extruding simultaneously a melted form of a base layer and a melted form of an outer layer into the shape of a cylinder by using a die, wherein the base layer comprises a polyester thermoplastic elastomer and an ionic-conductive agent and wherein the outer layer comprises a polyester thermoplastic elastomer having a melting point within ±50° C. of the melting point of the base layer; and wherein a temperature of said die during said extrusion is set to a temperature higher than a temperature at which said base layer and said outer layer can be plasticized; and wherein a melting viscosity of said outer layer is not less than 100 (Pa·s) and is not less than 1/5 times nor more than five times as high as said melting viscosity of said base layer at said temperature set for said die; and wherein the base layer has a volume resistivity set to not less than $1.0\times10^{6}$ (Ω·cm) and not more than $1.0\times10^{11}$ (Ω·cm); and a volume resistivity of said outer layer is set to not less than $1.0\times10^{11}$ (Ω·cm) and not less than 10 times as large as that of said base layer.

2. The method according to claim 1, wherein the laminated seamless belt has a thickness of 100 to 500 μm, and wherein a thickness of the outer layer is not more than ⅕ of the thickness of said laminated seamless belt.

3. The method according to claim 1, wherein the obtained laminated seamless belt has a tensile modulus of elasticity of 500 to 5000 kg/cm².

4. The method according to claim 1, wherein the amount of the ionic-conductive agent present in the base layer is 0.05 to 2.7 parts by weight of the polyester thermoplastic elastomer.

5. The method according to claim 3, wherein the amount of the ionic-conductive agent present in the base layer is 0.05 to 2.7 parts by weight of the polyester thermoplastic elastomer.

* * * * *